(12) United States Patent
Shimizu

(10) Patent No.: US 8,076,914 B2
(45) Date of Patent: Dec. 13, 2011

(54) SWITCHING REGULATOR INCLUDING LOW-PASS FILTER CONFIGURED TO HAVE TIME CONSTANT FOR STEP-UP OPERATION AND TIME CONSTANT FOR STEP-DOWN OPERATION

(75) Inventor: Shinya Shimizu, Kawanishi (JP)

(73) Assignee: Ricoh Company, Ltd., Tokyo (JP)

( * ) Notice: Subject to any disclaimer, the term of this patent is extended or adjusted under 35 U.S.C. 154(b) by 543 days.

(21) Appl. No.: 12/256,228

(22) Filed: Oct. 22, 2008

(65) Prior Publication Data
US 2009/0115392 A1 May 7, 2009

(30) Foreign Application Priority Data
Nov. 2, 2007 (JP) .................................. 2007-285981

(51) Int. Cl.
*G05F 1/59* (2006.01)
(52) U.S. Cl. ................. 323/271; 323/282; 323/351
(58) Field of Classification Search .................. 323/222, 323/271, 282, 351
See application file for complete search history.

(56) References Cited

U.S. PATENT DOCUMENTS

| | | | | |
|---|---|---|---|---|
| 6,166,527 A * | 12/2000 | Dwelley et al. | ............... | 323/222 |
| 6,208,127 B1 * | 3/2001 | Doluca | ..................... | 323/349 |
| 6,356,063 B1 * | 3/2002 | Brooks | ..................... | 323/284 |
| 6,369,557 B1 * | 4/2002 | Agiman | ..................... | 323/282 |
| 6,522,114 B1 * | 2/2003 | Bakker et al. | ............. | 323/282 |
| 6,975,164 B1 * | 12/2005 | Matsui et al. | ............. | 327/541 |
| 7,019,499 B2 * | 3/2006 | Chiu et al. | ..................... | 323/279 |
| 7,397,226 B1 * | 7/2008 | Mannama et al. | ........... | 323/273 |
| 7,573,252 B1 * | 8/2009 | Griesert | .................. | 323/315 |
| 2004/0124819 A1 * | 7/2004 | Bernardon | .................. | 323/282 |
| 2008/0054873 A1 * | 3/2008 | Inoue | ..................... | 323/351 |
| 2009/0066301 A1 * | 3/2009 | Oswald et al. | ............... | 323/271 |
| 2009/0115392 A1 * | 5/2009 | Shimizu | .................. | 323/283 |
| 2010/0001699 A1 * | 1/2010 | Dragojevic | .................. | 323/234 |

FOREIGN PATENT DOCUMENTS

| | | |
|---|---|---|
| JP | 5-115173 | 5/1993 |
| JP | 3497067 | 11/2003 |
| JP | 2006-10983 | 1/2006 |

* cited by examiner

*Primary Examiner* — Jeffrey Sterrett
(74) *Attorney, Agent, or Firm* — Cooper & Dunham LLP

(57) ABSTRACT

A switching regulator includes a step-down-and-step-up unit to convert an input voltage to a low voltage or to a high voltage in accordance with a control signal, and a controller including a low-pass filter to receive a reference voltage generated in accordance with an external control signal. The controller causes the step-down-and-step-up unit to perform a step-down operation or a step-up operation in accordance with a voltage difference between a proportional voltage proportional to an output voltage of the step-down-and-step-up unit and the reference voltage. The controller further causes the step-down-and-step-up unit to perform a step-down operation or a step-up operation in accordance with a voltage difference between an output voltage of the low-pass filter and the proportional voltage, and changes a time constant of the low-pass filter in accordance with the operation being performed.

4 Claims, 4 Drawing Sheets

SWITCHING REGULATOR INCLUDING LOW-PASS FILTER CONFIGURED TO HAVE TIME CONSTANT FOR STEP-UP OPERATION AND TIME CONSTANT FOR STEP-DOWN OPERATION

TECHNICAL FIELD

The present disclosure relates to a switching regulator used in portable devices such as mobile phones, digital cameras, and so on, and more particularly, to a switching regulator capable of preventing overshoot and undershoot in an output voltage.

BACKGROUND ART

Recently, energy saving has been actively promoted to protect the environment. For battery-powered portable equipment, such as mobile phones, digital cameras, and the like, energy efficiency is especially important to prolong battery life. Such portable equipment typically uses a switching regulator that includes an inductor because it is efficient and can be made compact.

Generally, the switching regulator is a constant voltage generator that converts an input voltage to a predetermined constant voltage in accordance with a control signal. There are mainly two methods to change an output voltage of such constant voltage generator, i.e., changing a reference voltage and changing a detection ratio of the output voltage.

Overshoot or undershoot in the output voltage may occur when the output voltage is changed rapidly. For example, the overshoot in the output voltage occurs when the output voltage changes from a low level to a high level, and the undershoot in the output voltage occurs when the output voltage changes from a high level to a low level. Such overshoot and undershoot in the output voltage should be avoided because the overshoot and undershoot may cause a load circuit, which is connected to the constant current, to malfunction.

In a known constant voltage generator that changes a detection ratio of the output voltage, a low-pass filter is employed and connected between an output voltage detector and an error amplifier for a predetermined time period from a start of a change of the output voltage. Accordingly, it is necessary to determine the time constant of the low-pass filter while taking into consideration a cross-over frequency of the constant voltage generator. If the time constant of the low-pass filter is too small, the overshoot or the undershoot in the output voltage may occur. By contrast, if the time constant of the low-pass filter is too large, although the overshoot or the undershoot in the output voltage may not occur it takes longer to reach a predetermined target voltage.

When the output voltage range is wide, ranging between a wide range between a low voltage lower than the input voltage and a high voltage higher than the input voltage, a step-down-and-step-up switching regulator is generally used. The step-down-and-step-up switching regulator has different cross-over frequencies for different operational conditions, i.e., a step-down operation and a step-down operation. If the input voltage is equal for both operational conditions, the cross-over frequency at the step-down operation is higher than the cross-over frequency at the step-up operation.

Thus, if the time constant of the low-pass filter is set to the cross-over frequency at the step-down operation, overshoot and undershoot in the output voltage occurs at the step-up operation. By contrast, if the time constant of the low-pass filter is set to the cross-over frequency at the step-up operation, it takes longer to reach a predetermined target voltage at the step-down operation.

BRIEF SUMMARY

In an aspect of this disclosure, there is provided a novel switching regulator that includes a step-down-and-step-up unit to convert an input voltage to a low voltage or to a high voltage in accordance with a control signal, and a controller including a low-pass filter to receive a reference voltage generated in accordance with an external control signal. The controller causes the step-down-and-step-up unit to perform a step-down operation or a step-up operation in accordance with a voltage difference between a proportional voltage proportional to an output voltage of the step-down-and-step-up unit and the reference voltage. The controller further causes the step-down-and-step-up unit to perform a step-down operation or a step-up operation in accordance with a voltage difference between an output voltage of the low-pass filter and the proportional voltage, and changes a time constant of the low-pass filter in accordance with the operation being performed.

In another aspect of this disclosure, there is provided a novel switching regulator that includes a step-down-and-step-up unit to convert an input voltage to a low voltage or to a high voltage in accordance with a control signal, and a controller including a low-pass filter to receive a proportional voltage proportional to an output voltage of the step-down-and-step-up unit and generated based on a ratio determined in accordance with an external control signal. The controller causes the step-down-and-step-up unit to perform a step-down operation or a step-up operation in accordance with a voltage difference between the proportional voltage and a predetermined reference voltage. The controller further causes the step-down-and-step-up unit to perform a step-down operation or a step-up operation in accordance with a voltage difference between an output voltage of the low-pass filter and the reference voltage, and the controller changes a time constant of the low-pass filter in accordance with the operation being performed.

BRIEF DESCRIPTION OF THE DRAWINGS

A more complete appreciation of the aforementioned and other aspects, features and advantages may be better understood by reference to the following detailed description when considered in connection with the accompanying drawings, wherein.

DETAILED DESCRIPTION OF PREFERRED EMBODIMENTS

Figure 1:
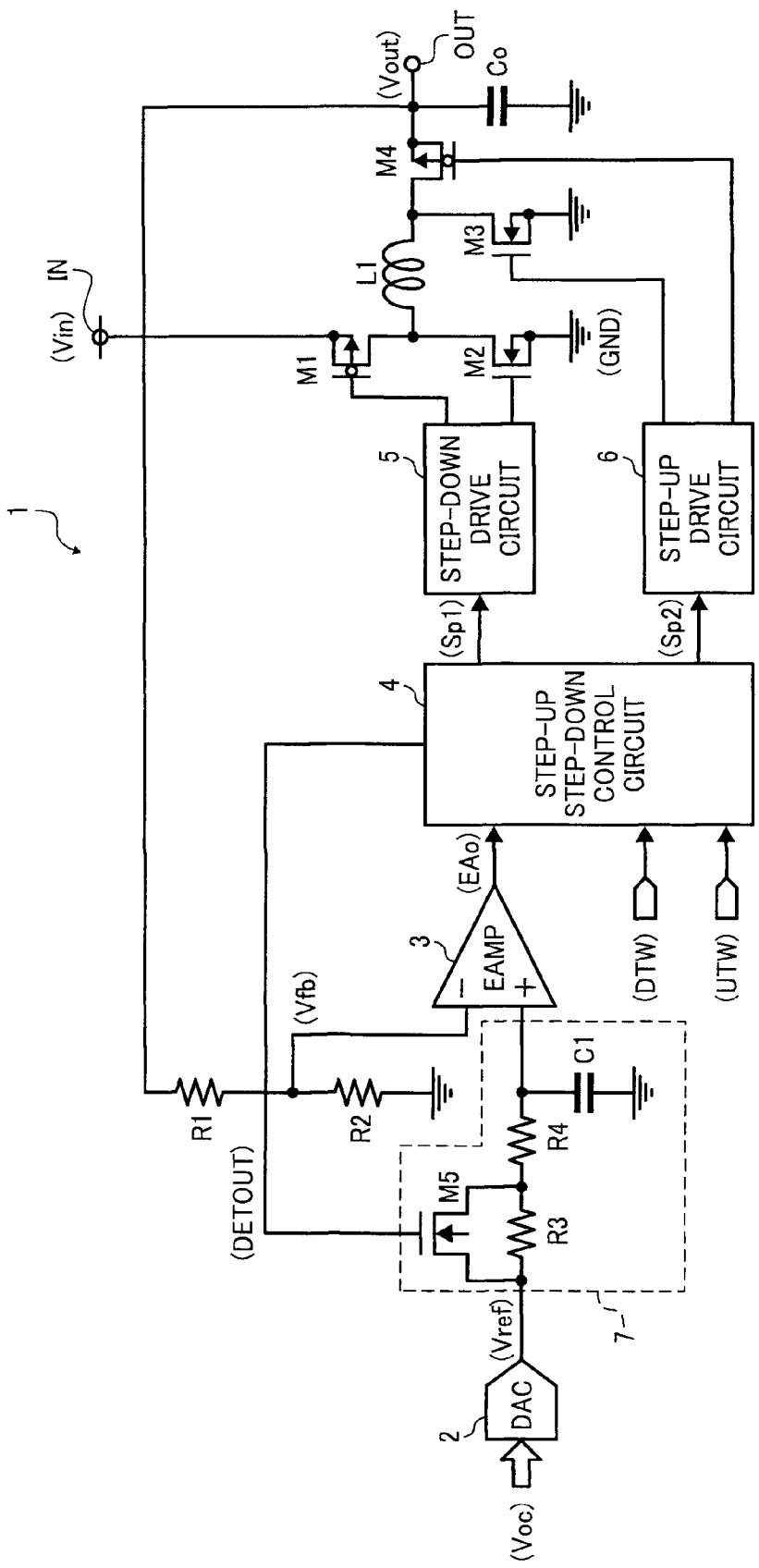
FIG. 1 is circuit diagram of a switching regulator according to an illustrative embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIG. 1, a switching regulator according to an illustrative embodiment is described.

FIG. 1 is a circuit diagram of a switching regulator according to an illustrative embodiment. The switching regulator 1 is a step-down-and-step-up switching regulator that converts an input voltage Vin input at an input terminal IN to a predetermined voltage, and outputs the converted voltage as an output voltage Vout from an output terminal OUT. The switching regulator 1 includes an inductor L1, a step-down switching transistor M1, a step-down synchronous rectification transistor M2, a step-up switching transistor M3 and a step-up synchronous rectification transistor M4.

The step-down switching transistor M1 is a PMOS (P-type Metal Oxide Semiconductor) transistor, and performs a step-down switching operation in accordance with a control signal to charge the inductor L1 with the input voltage Vin. The step-down synchronous rectification transistor M2 is an NMOS transistor, and performs a step-down switching operation in accordance with the control signal to discharge the inductor L1.

The step-up switching transistor M3 is an NMOS (N-type Metal Oxide Semiconductor) transistor, and performs a step-up switching operation in accordance with the control signal by charging the inductor L1 with the input voltage Vin. The step-up synchronous rectification transistor M4 is a PMOS transistor, and performs a step-up switching operation in accordance with the control signal by discharging the inductor L1.

Further, the switching regulator 1 includes resistors R1 and R2, an output capacitor Co, a D/A (Digital and Analog) converter 2, an error amplifier 3, a step-up-and-step-down control circuit 4, a step-down drive circuit 5, a step-up drive circuit 6, and a low-pass filter 7. The resistors R1 and R2 generates a dividing voltage Vfb by dividing an output voltage Vout. The D/A converter 2 generates and outputs a reference voltage Vref based on a digital signal Voc input externally. The low-pass filter 7 includes an NMOS transistor M5, resistors R3 and R4 and a capacitor C1.

The step-down switching transistor M1, the step-down synchronous rectification transistor M2, the step-up switching transistor M3, the step-up synchronous rectification transistor M4, the inductor L1 and the output capacitor Co together form a step-down-and-step-up unit. The D/A converter 2, the error amplifier 3, the step-up-and-step-down control circuit 4, the step-down drive circuit 5, the step-up drive circuit 6, the low-pass filter 7 and the resistors R1 and R2 together form a control unit. Further, the error amplifier 3 forms an error amplifier unit, and the step-up-and-step-down control circuit 4, the step-down drive circuit 5 and the step-up drive circuit 6 together form a step-down-and-step-up control unit. Further, the dividing voltage Vfb is a proportional voltage proportional to the output voltage Vout.

In FIG. 1, excepting the inductor L1 and the capacitor C1, all the circuit elements may be integrated on a single chip. Further, excepting at least one of switching transistors M1, M2, M3, and M4, the inductor L1, and the capacitor C1, all the circuit elements may be integrated on a single chip.

The step-down switching transistor M1 and the step-down synchronous rectification transistor M2 are connected in series between an input voltage terminal IN and ground. The inductor L1 and the step-up synchronous rectification transistor M4 are connected in series between an output terminal OUT and a junction node between the step-down switching transistor M1 and the step-down synchronous rectification transistor M2. The step-up switching transistor M3 is connected between ground and a junction node between the inductor L1 and the step-up synchronous rectification transistor M4. The output capacitor Co is connected between the output terminal OUT and ground, and the resistors R1 and R2 are connected in parallel therebetween. The dividing voltage Vfb is output from a junction node between the resistors R1 and R2.

The reference voltage Vref output from the D/A converter 2 is input to a non-inverting input terminal of the error amplifier 3 through the low-pass filter 7. The dividing voltage Vfb is input to an inverting input terminal of the error amplifier 3. The error amplifier 3 amplifies a voltage difference between the dividing voltage Vfb and the reference voltage Vref input through the low-pass filter 7, and generates and outputs an output signal EAo.

The resistors R3 and R4 are connected in series between an output terminal of the D/A converter 2 and the non-inverting input terminal of the error amplifier 3. The capacitor C1 is connected between the non-inverting input terminal of the error amplifier 3 and ground. The NMOS transistor M5 is connected in parallel with the resistor R3. A control signal DETOUT output from the step-up-and-step-down control circuit 4 is input to a gate of the NMOS transistor M5.

The output signal EAo output from the error amplifier 3, a predetermined step-down triangular signal DTW, and a predetermined step-up triangular signal UTW are input to the step-up-and-step-down control circuit 4 to perform a step-down operation or a step-up operation. The step-down triangular signal DTW and the step-up triangular signal UTW may be input externally, or generated by a generator provided in the switching regulator 1.

At a step-down operation, the step-up-and-step-down control circuit 4 performs a voltage comparison between the output signal EAo output from the error amplifier 3 and the step-down triangular signal DTW. Further, the step-up-and-step-down control circuit 4 generates a step-down pulse signal Sp1 for PWM control, outputs the step-down pulse signal Sp1 to the step-down drive circuit 5, and outputs the control signal DETOUT with a high level.

At a step-up operation, the step-up-and-step-down control circuit 4 performs a voltage comparison between the output signal EAo output from the error amplifier 3 and the step-up triangular signal UTW. Further, the step-up-and-step-down control circuit 4 generates a step-up pulse signal Sp2 for PWM control, outputs the step-up pulse signal Sp2 to the step-up drive circuit 6, and outputs the control signal DETOUT with a low level.

The step-down drive circuit 5 performs a switching control with the step-down switching transistor M1 and the step-down synchronous rectification transistor M2 in accordance with the step-down pulse signal Sp1. The step-up drive circuit 6 performs a switching control with the step-up switching transistor M3 and the step-up synchronous rectification transistor M4 in accordance with the step-up pulse signal Sp2. The NMOS transistor M5 turns on to create a conduction state at the step-down operation, and turns off to create a shutdown state at the step-up operation.

With this circuit configuration, at a step-down operation, the step-up-and-step-down control circuit 4 causes the step-up drive circuit 6 to turn off the step-up switching transistor M3 and turn on the step-up synchronous rectification transistor M4. Further, the step-up-and-step-down control circuit 4 causes the step-down drive circuit 5 to turn on and off the step-down switching transistor M1 and the step-down synchronous rectification transistor M2 complementarily so that the dividing voltage Vfb becomes the reference voltage Vref input through the low-pass filter 7.

At a step-up operation, the step-up-and-step-down control circuit 4 causes the step-down drive circuit 5 to turn on the step-down switching transistor M1 and turn off the step-down synchronous rectification transistor M2. Further, the step-up-and-step-down control circuit 4 causes the step-up drive circuit 6 to turn on and off the step-up switching transistor M3 and the step-up synchronous rectification transistor M4 complementarily so that the dividing voltage Vfb becomes the reference voltage Vref input through the low-pass filter 7.

The low-pass filter 7 cuts high-frequency elements when the reference voltage Vref changes. Since the NMOS transistor MS turns on to create a conduction state at the step-down operation, the resistor is shorted. Accordingly, a time constant Td in the low-pass filter 7 is expressed as $$Td = r4 \times c1$$

at a step-down operation, where resistance of the resister R4 is r4, and capacitance of the capacitor C1 is c1.

Further, since the NMOS transistor MS turns off to create a shutdown state at a step-up operation, a time constant Tu in the low-pass filter 7 is expressed as $$Tu = (r3 + r4) \times c1$$

where resistance of the resister R3 is r3. Thus, in the low-pass filter 7, the time constant Tu at the step-up operation is larger than the time constant Td at the step-down operation. Therefore, the time constant in the low-pass filter 7 can be optimized with each cross-over frequency both at the step-down and the step-up operations.

In FIG. 1, a resistance value of the time constant of the low-pass filter 7 at a step-down operation is changed to have a different resistance value of the time constant of the low-pass filter 7 at a step-up operation. Alternatively, however, a capacitance value of the time constant of the low-pass filter 7 may be changed instead.

Figure 2:
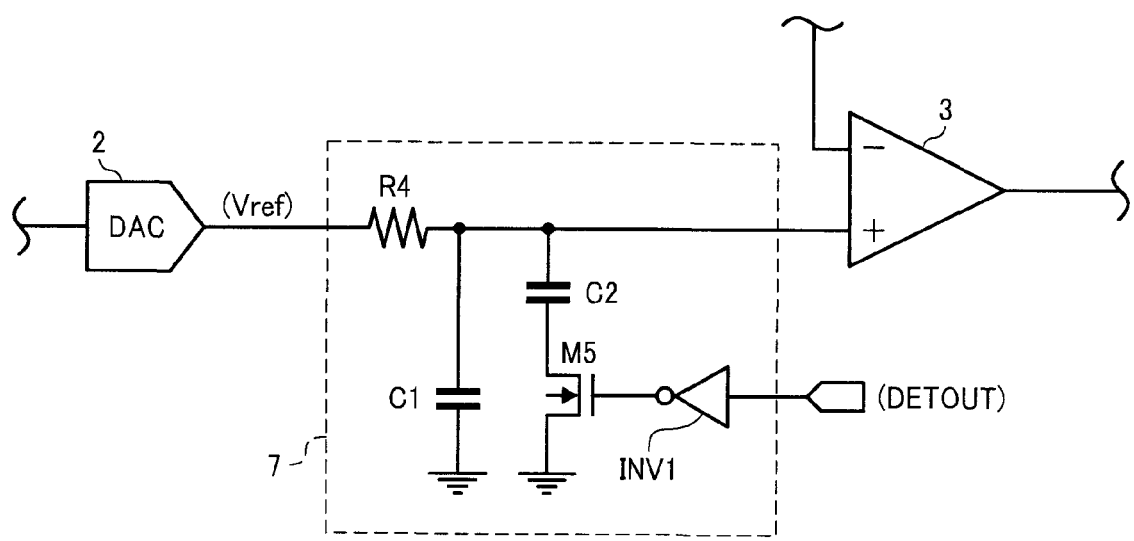
FIG. 2 a circuit diagram of a low-pass filter used in the switching regulator of FIG. 1.

FIG. 2 is a circuit diagram of the low-pass filter 7 in which the capacitance value of the time constant of the low-pass filter 7 can be changed. In FIG. 2, identical reference characters are assigned to identical or similar circuit members shown in FIG. 1 and descriptions thereof are omitted.

The low-pass filter 7 includes the NMOS transistor M5, the resistor R4, capacitors C1 and C2, and an inverter INV1. The resistor R4 is connected between the output terminal of the D/A converter 2 and the non-inverting input terminal of the error amplifier 3. The capacitor C1 is connected between the non-inverting input terminal of the error amplifier 3 and ground, and a series circuit of the capacitor C2 and the NMOS transistor MS is connected in parallel with the capacitor C1 between the non-inverting input terminal of the error amplifier 3 and ground. Further, the control signal DETOUT output from the step-up-and-step-down control circuit 4 is input to the gate of the NMOS transistor MS through the inverter INV1.

Since the NMOS transistor MS turns off to create a shutdown state at the step-down operation, the time constant Td in the low-pass filter 7 is expressed as $$Td = r4 \times c1$$

at a step-down operation. Further, since the NMOS transistor MS turns on to create a conduction state at a step-up operation, a time constant Tu in the low-pass filter 7 is expressed as $$Tu = r4 \times (c1 + c2)$$

at a step-up operation, where capacitance of the capacitor C2 is c2. Thus, in the low-pass filter 7, the time constant Tu at the step-up operation is larger than the time constant Td at the step-down operation. Accordingly, the time constant of the low-pass filter 7 can be optimized with each cross-over frequency both at the step-down and the step-up operations.

In the above description, the reference voltage Vref is changed to adjust the output voltage Vout. Alternatively, however, a dividing ratio of the resistors R1 and R2 may be changed to determine the dividing voltage Vfb.

Figure 3:
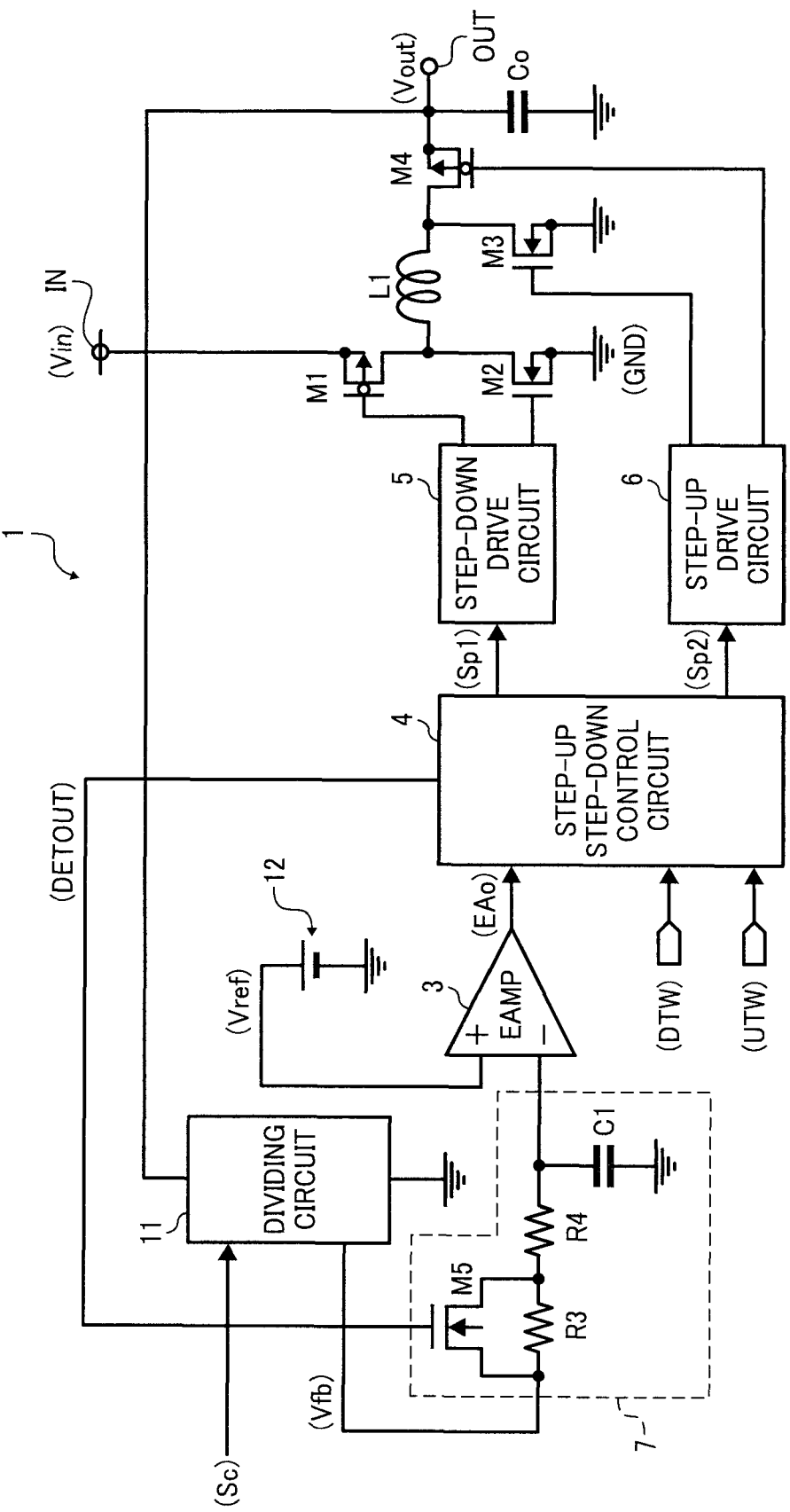
FIG. 3 is circuit diagram of another switching regulator according to a second illustrative embodiment.
Figure 4:
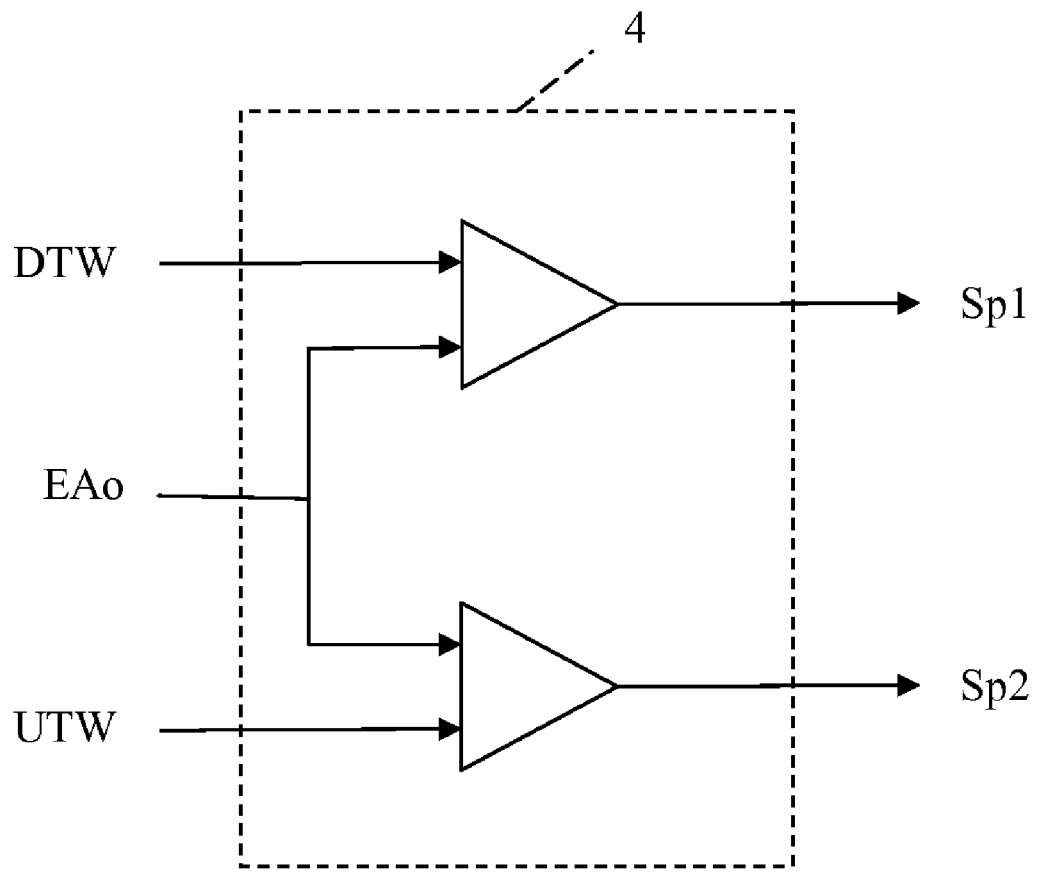
FIG. 4 is a schematic diagram of a step-up-and-step-down control circuit or controller, according to an exemplary embodiment.

FIG. 3 is another switching regulator 1, which changes a dividing ratio for the output voltage Vout. The switching regulator 1 includes a dividing circuit 11, which replaces the resistors R1 and R2 of FIG. 1, and a reference voltage generator 12. The dividing circuit 11 changes the dividing ratio for the output voltage Vout by an external control signal Sc so as to generate and output a desired dividing voltage Vfb. Further, the reference voltage generator 12 generates and outputs a predetermined reference voltage Vref. The dividing voltage Vfb output from the dividing circuit 11 is input to an inverting input terminal of the error amplifier 3 through the low-pass filter 7. A reference voltage Vref output from the reference voltage generator 12 is input to a non-inverting input terminal of the error amplifier 3. In this circuit configuration, the error amplifier 3, the step-up-and-step-down control circuit 4, the step-down drive circuit 5, the step-up drive circuit 6, the low-pass filter 7, the dividing circuit 11 and the reference voltage generator 12 form a control unit. Additionally, the low-pass filter 7 of FIG. 2 can be employed in the switching regulator 1 of FIG. 3.

As described above, in the switching regulator according to an illustrative embodiment, a change in the reference voltage Vref or the dividing voltage Vfb is input to the error amplifier 3 through the low-pass filter 7. Further, a time constant of the low-pass filter 7 can be changed depending on operational mode so that the time constant in the low-pass filter 7 can be optimized both at the step-down operation and the step-up operation.

Accordingly, when the output voltage Vout changes dynamically, the output voltage Vout can reach a target voltage in a short time without generating overshoot or undershoot in the output voltage Vout.

Numerous additional modifications and variations are possible in light of the above teachings. It is therefore to be understood that, within the scope of the appended claims, the disclosure of this patent specification may be practiced otherwise than as specifically described herein.

This patent specification is based on Japanese Patent Application No. 2007-285981 filed on Nov. 2, 2007 in the Japanese Patent Office, the entire contents of which are incorporated by reference herein.

What is claimed is:

1. A switching regulator, comprising:
a step-down-and-step-up unit configured to convert an input voltage to a low voltage that is lower than the input voltage or to a high voltage that is higher than the input voltage in accordance with a control signal; and
a controller including a low-pass filter to receive a reference voltage generated in accordance with an external control signal and configured to cause the step-down-and-step-up unit to perform a step-down operation or a step-up operation in accordance with a voltage difference between a proportional voltage proportional to an output voltage of the step-down-and-step-up unit and the reference voltage,
the controller causing the step-down-and-step-up unit to perform a step-down operation or a step-up operation in accordance with a voltage difference between an output voltage of the low-pass filter and the proportional voltage, and changing a time constant of the low-pass filter in accordance with the operation being performed, wherein the controller changes the time constant of the low-pass filter so that a time constant of the low-pass filter at a step-up operation is larger than a time constant of the low-pass filter at a step-down operation.

2. The switching regulator of claim 1, wherein the low-pass filter is configured to change the time constant in accordance with a control signal, and wherein the controller comprises:

an error amplifier configured to amplify a voltage difference between the output voltage of the low-pass filter and the proportional voltage and output an amplified voltage; and a step-down-and-step-up controller configured to perform a step-down operation or a step-up operation using pulse signals generated by comparing voltages of the output signal of the error amplifier and a triangular wave signal for step-down or step-up operation, wherein the step-down-and-step-up controller changes the time constant of the low-pass filter so that a time constant of the low-pass filter at a step-up operation is larger than a time constant of the low-pass filter at step-down operation.

3. A switching regulator, comprising:

a step-down-and-step-up unit configured to convert an input voltage to a low voltage that is lower than the input voltage, or a high voltage that is higher than the input voltage in accordance with a control signal; and a controller including a low-pass filter to receive a proportional voltage and configured to cause the step-down-and-step-up unit to perform a step-down operation or a step-up operation in accordance with a voltage difference between the proportional voltage and a predetermined reference voltage, the proportional voltage being proportional to an output voltage of the step-down-and-step-up unit and generated based on a ratio determined in accordance with an external control signal, the controller causing the step-down-and-step-up unit to perform a step-down operation or a step-up operation in accordance with a voltage difference between an output voltage of the low-pass filter and the reference voltage, and changing a time constant of the low-pass filter in accordance with the operation being performed, wherein the controller changes the time constant of the low-pass filter so that the time constant of the low-pass filter at a step-up operation is larger than time constant of the low-pass filter at step-down operation.

4. The switching regulator of claim 3, wherein the low-pass filter is configured to change the time constant in accordance with a control signal, and wherein the controller comprises:

an error amplifier configured to amplify a voltage difference between an output voltage of the low-pass filter and the predetermined reference voltage and output an amplified voltage; and a step-down-and-step-up controller configured to perform a step-down operation or a step-up operation using a pulse signal generated by comparing voltages of the output signal of the error amplifier and a triangular wave signal for step-down or step-up operation, wherein the step-down-and-step-up controller changes the time constant of the low-pass filter so that the time constant of the low-pass filter at a step-up operation is larger than time constant of the low-pass filter at step-down operation.

* * * * *